US006934817B2

(12) United States Patent
Ellison et al.

(10) Patent No.: US 6,934,817 B2
(45) Date of Patent: Aug. 23, 2005

(54) CONTROLLING ACCESS TO MULTIPLE MEMORY ZONES IN AN ISOLATED EXECUTION ENVIRONMENT

(75) Inventors: Carl M. Ellison, Portland, OR (US); Roger A. Golliver, Beaverton, OR (US); Howard C. Herbert, Phoenix, AZ (US); Derrick C. Lin, San Mateo, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/683,542

(22) Filed: Oct. 10, 2003

(65) Prior Publication Data

US 2004/0078590 A1 Apr. 22, 2004

Related U.S. Application Data

(63) Continuation of application No. 09/618,489, filed on Jul. 18, 2000, now Pat. No. 6,633,963.
(60) Provisional application No. 60/198,227, filed on Mar. 31, 2000.

(51) Int. Cl.[7] .............................................. G06F 12/14
(52) U.S. Cl. ........................ 711/153; 711/163; 711/152; 711/170; 711/173; 711/220
(58) Field of Search ............................ 711/1, 147, 151, 711/152, 153, 163, 164, 170, 173, 220; 709/213

(56) References Cited

U.S. PATENT DOCUMENTS 3,699,532 A  10/1972  Schaffer et al.
3,996,449 A  12/1976  Attanasio et al.

(Continued)

FOREIGN PATENT DOCUMENTS

DE   4217444   12/1992
EP   473913    3/1992

(Continued)

OTHER PUBLICATIONS

Berg, Cliff, "How Do I Create a Signed Applet?", *Dr. Dobb's Journal*, (Aug. 1997), 1–9.
Brands, Stefan, "Restrictive Blinding of Secret–Key Certificates", *Springer–Verlag XP002201306*, (1995), Chapter 3.

(Continued)

*Primary Examiner*—B. James Peikari
(74) *Attorney, Agent, or Firm*—Blakely, Sokoloff, Taylor & Zafman LLP

(57) ABSTRACT

The present invention provides a method, apparatus, and system for controlling memory accesses to multiple memory zones in an isolated execution environment. A processor having a normal execution mode and an isolated execution mode generates an access transaction. The access transaction is configured using a configuration storage that stores configuration settings. The configuration settings include a plurality of subsystem memory range settings defining memory zones. The access transaction also includes access information. A multi-memory zone access checking circuit, coupled to the configuration storage, checks the access transaction using at least one of the configuration settings and the access information. The multi-memory zone access checking circuit generates an access grant signal if the access transaction is valid.

36 Claims, 8 Drawing Sheets

U.S. PATENT DOCUMENTS

| | | |
|---|---|---|
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. ............ 711/166 |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth ................ 711/164 |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. ...... 711/163 |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Insley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. ......... 713/200 |
| 6,252,650 B1 | 6/2001 | Nakaumra |

| | | |
|---|---|---|
| 6,269,392 B1 | 7/2001 | Cotichini et al. |
| 6,272,533 B1 | 8/2001 | Browne et al. ............ 709/213 |
| 6,272,637 B1 | 8/2001 | Little et al. ................ 713/194 |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett ....................... 711/153 |
| 6,301,646 B1 | 10/2001 | Hostetter |
| 6,308,270 B1 | 10/2001 | Guthery et al. |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. ........... 710/105 |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarlane et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0018892 A1 | 1/2003 | Tello |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2004/0117539 A1 | 6/2004 | Bennett et al. |

FOREIGN PATENT DOCUMENTS

| | | |
|---|---|---|
| EP | 0600112 | 6/1994 |
| EP | 0602867 | 6/1994 |
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 A1 * | 11/2000 |
| EP | 1056014 | 11/2000 |
| EP | 1085396 | 3/2001 |
| EP | 1146715 | 10/2001 |
| EP | 1209563 | 5/2002 |
| EP | 1271277 | 1/2003 |
| JP | 2000076139 | 3/2000 |
| WO | WO9524696 | 9/1995 |
| WO | WO-9729567 | 8/1997 |
| WO | WO9812620 | 3/1998 |
| WO | WO-9834365 | 8/1998 |
| WO | WO-9844402 | 10/1998 |
| WO | WO-9905600 | 2/1999 |
| WO | WO9918511 | 4/1999 |
| WO | WO-9957863 | 11/1999 |
| WO | WO9965579 | 12/1999 |
| WO | WO0021238 | 4/2000 |
| WO | WO-0062232 | 10/2000 |
| WO | WO-0127723 | 4/2001 |
| WO | WO-0127821 | 4/2001 |
| WO | WO0163994 | 8/2001 |
| WO | WO-0175565 | 10/2001 |
| WO | WO-0175595 | 10/2001 |
| WO | WO0201794 | 1/2002 |
| WO | WO-9909482 | 1/2002 |
| WO | WO-0217555 | 2/2002 |
| WO | WO02060121 | 8/2002 |
| WO | WO-0175564 | 10/2002 |
| WO | WO-02086684 | 10/2002 |
| WO | WO03058412 | 7/2003 |

OTHER PUBLICATIONS

Chien, Andrew A., et al., "Safe and Protected Execution for the Morph/AMRM Reconfigurable Processor", *7th Annual IEEE Symposium, FCCM '99 Proceedings, XP010359180, ISBN 0–7695–0375–6, Los Alamitos, CA,* (Apr. 21, 1999), 209–221.

Compaq Computer Corporation, et al., "Trusted Computing Platform Alliance (TCPA) Main Specification Version 1.1a", (Dec. 2001),1–321.

Davida, George I., et al., "Defending Systems Against Viruses through Cryptographic Authentication", *Proceedings of the Symposium on Security and Privacy,* IEEE Comp. Soc. Press, ISBN 0–8186–1939–2,(May 1989).

Goldberg, Robert P., "Survey of Virtual Machine Research", *Computer Magazine,* (Jun. 1974),34–35.

Gong, Li, et al., "Going Behond the Sandbox: An Overview of the New Security Architecture in the Java Development Kit 1.2", *Proceedings of the USENIX Symposium on Internet Technologies and Systems,* Monterey, CA,(Dec. 1997).

Gum, P. H., "System/370 Extended Architecture: Facilities for Virtual Machines", *IBM J. Research Development,* vol. 27, No. 6, (Nov. 1983),530–544.

Heinrich, Joe , "MIPS R4000 Microprocessor User's Manual, Second Edition", *Chapter 4 "Memory Management",* (Jun. 11, 1993),61–97.

IBM, "Information Display Technique for a Terminate Stay Resident Program IBM Technical Disclosure Bulletin", *TDB–ACC–No. NA9112156, vol. 34, Issue 7A,* (Dec. 1, 1991), 156–158.

Intel, "Intel386 DX Microprocessor 32–Bit CHMOS Microprocessor With Integrated Memory Management", (1995), 5–56.

Karger, Paul A., et al., "A VMM Security Kernal for the VAX Architecture", *Proceedings of the Symposium on Research in Security and Privacy, XP010020182, ISBN 0–8186–2060–9, Boxborough, MA,* (May 7, 1990),2–19.

Kashiwagi, Kazuhiko, et al., "Design and Implementation of Dynamically Reconstructing System Software", *Software Engineering Conference,* Proceedings 1996 Asia–Pacific Seoul, South Korea Dec. 4–7, 1996, Los Alamitos, CA USA, IEEE Comput. Soc, US, ISBN 0–8186–7638–8,(1996).

Lawton, Kevin, et al., "Running Multiple Operating Systems Concurrently on an IA32 PC Using Virtualization Techniques", http://www.plex86.org/research/paper.txt, (Nov. 29, 1999), 1–31.

Luke, Jahn, et al., "Replacement Strategy for Aging Avionics Computers", *IEEE AES Systems Magazine,* XP002190614,(Mar. 1999).

Menezes, Oorschot, "Handbook of Applied Cryptography", *CRC Press LLC, USA XP002201307,* (1997),475.

Motorola, "M68040 User's Manual", (1993), 1–1 to 8–32.

Richt, Stefan, et al., "In–Circuit–Emulator Wird Echtzeittauglich", *Elektronic, Franzis Verlag GMBH, Munchen, DE,* vol. 40, No. 16, XP000259620,(100–103),Aug. 6, 1991.

Robin, John S., et al., "Analysis of the Pentium's Ability to Support a Secure Virtual Machine Monitor", *Proceedings of the 9th USENIX Security Symposium, XP002247347, Denver, Colorado,* (Aug. 14, 2000),1–17.

Rosenblum, M., "Virtual Platform: A Virtual Machine Monitor for Commodity PC", *Proceedings of the 11th Hotchips Conference,* (Aug. 17, 1999), 185–196.

Saez, Sergio, et al., "A Hardware Scheduler for Complex Real–Time Systems", *Proceedings of the IEEE International Symposium on Industrial Electronics,* XP002190615, (Jul. 1999), 43–48.

Sherwood, Timothy, et al., "Patchable Instruction ROM Architecture", *Department of Computer Science and Engineering, University of California, San Diego, La Jolla, Ca,* (Nov. 2001).

Coulouris, George, et al., "Distributed Systems, Concepts and Designs", *2nd Edition,* (1994),422–424.

Crawford, John, "Architecture of the Intel 80386", *Proceedings of the IEEE International Conference on Computer Design: VLSI in Computers and Processors (ICCD '86),* (Oct. 6, 1986),155–160.

Fabry, R.S., "Capability–Based Addressing", *Fabry, R.S., "Capability–Based Addressing," Communications of the ACM,* vol. 17, No. 7, (Jul. 1974),403–412.

Frieder, Gideon, "The Architecture And Operational Characteristics of the VMX Host Machine", *The Architecture And Operational Characteristics of the VMX Host Machine, IEEE,* (1982),9–16.

HP Mobile Security Overview, "HP Mobile Security Overview", (Sep. 2002),1–10.

IBM Corporation, "IBM ThinkPad T30 Notebooks", *IBM Product Specification,* located at www.1.ibm.com/services/files/cisco_t30_spec_sheet_070202.pdf, last visited Jun. 23, 2004,(Jul. 2, 2002),1–6.

Intel, "IA–32 Intel Architecure Software Developer's Manual", *vol. 3; System Programming Guide,* Intel Corporation—2003, 13–1 through 13–24.

Intel Corporation, "IA–64 System Abstraction Layer Specification", *Intel Product Specification, Order No. 245359–001,* (Jan. 2000),1–112.

Intel Corporation, "Intel 82802AB/82802AC Firmware Hub (FWH)", *Intel Product Datasheet,* Document No. 290658–004,(Nov. 2000),1–6, 17–28.

Intel Corporation, "Intel IA–64 Architecture Software Developer's Manual", *vol. 2: IA–64 System Architecture, Order No. 245318–001,* (Jan. 2000),i, ii, 5.1–5.3, 11.1–11.8, 11.23–11.26.

Menezes, Alfred J., et al., "Handbook of Applied Cryptography", *CRC Press Series on Discrete Mathematices and its Applications,* Boca Raton, FL, XP002165287, ISBN 0849385237,(Oct. 1996),403–405, 506–515, 570.

Nanba, S., et al., "VM/4: ACOS–4 Virtual Machine Architecture", *VM/4: ACOS–4 Virtual Machine Architecture, IEEE,* (1985),171–178.

RSA Security, "Hardware Authenticators", www.rsasecurity.com/node.asp?id=1158, 1–2.

RSA Security, "RSA SecurID Authenticators", www.rsasecurity.com/products/securid/datasheets/SID_DS_0103.pdf, 1–2.

RSA Security, "Software Authenticators", www.rsasecurity.com/node.asp?id=1313, 1–2.

Schneier, Bruce, "Applied Cryptography: Protocols, Algorithm, and Source Code in C", *Wiley, John & Sons, Inc.,* XP002939871; ISBN 0471117099,(Oct. 1995),47–52.

Schneier, Bruce, "Applied Cryptography: Protocols, Algorithm, and Source Code in C", *Wiley, John & Sons, Inc.,* XP002138607; ISBN 0471117099,(Oct. 1995),56–65.

Schneier, Bruce, "Applied Cryptography: Protocols, Algorithm, and Source Code in C", *Wiley, John & Sons, Inc.,* XP0021111449; ISBN 0471117099,(Oct. 1995), 169–187.

Schneier, Bruce, "Applied Cryptography: Protocols, Algorithms, and Source Code in C", *2nd Edition; Wiley, John & Sons, Inc.,* XP002251738; ISBN 0471128457,(Nov. 1995), 28–33; 176–177; 216–217; 461–473; 518–522.

* cited by examiner

US 6,934,817 B2

CONTROLLING ACCESS TO MULTIPLE MEMORY ZONES IN AN ISOLATED EXECUTION ENVIRONMENT

RELATED APPLICATION

This application is a Continuation of Application No. 09/618,489, filed Jul. 18, 2000, now issued as U.S. Pat. No. 6,633,963, which claims the benefit of U.S. Provisional Patent Application No. 60/198,227 filed on Mar. 31, 2000.

BACKGROUND

1. Field of the Invention

This invention relates to microprocessors. In particular, the invention relates to processor security.

2. Description of Related Art

Advances in microprocessor and communication technologies have opened up many opportunities for applications that go beyond the traditional ways of doing business. Electronic commerce (E-commerce) and business-to-business (B2B) transactions are now becoming popular and are conducted throughout global markets at continuously increasing rates. Unfortunately, while modern microprocessor systems provide users convenient and efficient methods of doing business, communicating and transacting, they are also vulnerable for unscrupulous attacks. Examples of these attacks include virus, intrusion, security breach, and tampering, to name a few. Computer security, therefore, is becoming more and more important to protect the integrity of the computer systems and increase the trust of users.

Threats caused by unscrupulous attacks may be in a number of forms. An invasive remote-launched attack by hackers may disrupt the normal operation of a system connected to thousands or even millions of users. A virus program may corrupt code and/or data of a single-user platform.

Existing techniques to protect against attacks have a number of drawbacks. Anti-virus programs can only scan and detect known viruses. Security co-processors or smart cards using cryptographic or other security techniques have limitations in speed performance, memory capacity, and flexibility. Further, redesigning operating systems creates software compatibility issues and requires tremendous investment in development efforts.

BRIEF DESCRIPTION OF THE DRAWINGS

The features and advantages of the present invention will become apparent from the following detailed description of the present invention in which.

DESCRIPTION

Figure 1A:
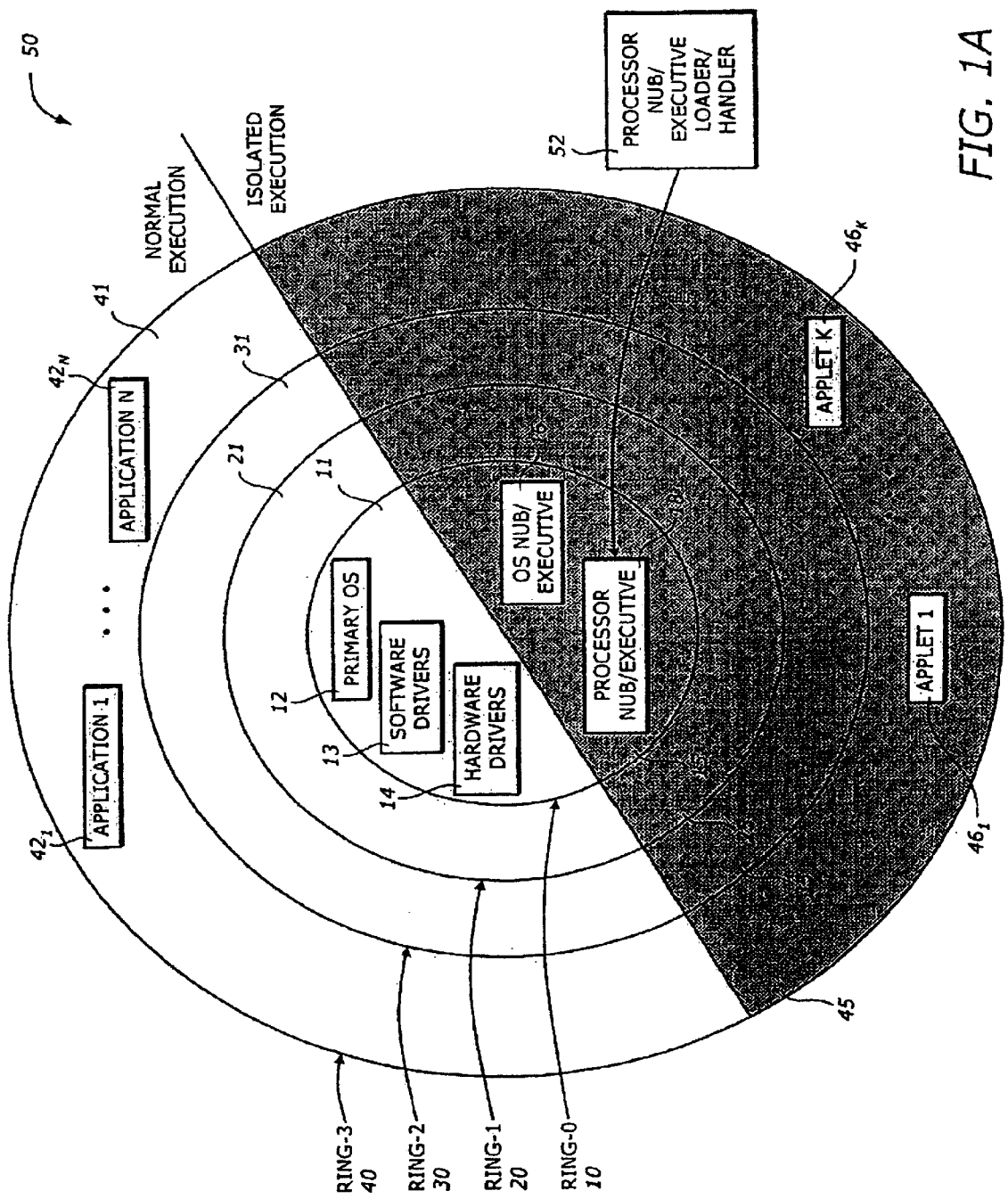
FIG. 1A is a diagram illustrating an operating system according to one embodiment of the invention.

The present invention is a method, apparatus and system to control memory accesses to multiple memory zones in an isolated execution environment. A processor having a normal execution mode and an isolated execution mode generates an access transaction. The access transaction is configured using a configuration storage that stores configuration settings. The configuration settings include a plurality of subsystem memory range settings defining multiple memory zones. The access transaction also includes access information. A multi-memory zone access checking circuit, coupled to the configuration storage, checks the access transaction using at least one of the configuration settings and the access information. The multi-memory zone access checking circuit generates an access grant signal if the access transaction is valid.

In one embodiment, the configuration settings include an isolated setting, a plurality of subsystem memory range settings, and an execution mode word. The access information includes a physical address. The configuration storage includes a setting storage to store the isolated setting that defines an isolated memory area in a memory external to the processor. The isolated setting includes a base register, a mask register and a length register to store a base value, a mask value and a length value, respectively. A combination of at least two of the base, mask and length values can be used to form the isolated setting. The configuration storage further includes a subsystem memory range storage that stores the plurality of subsystem memory range settings. Each subsystem memory range setting defines a memory zone for a subsystem in the isolated memory area. Each subsystem memory range setting includes a subsystem mask value, a subsystem base value and a subsystem length value. A combination of at least two of the subsystem base, mask and length values can be used to define a memory zone. The subsystem memory range storage further includes ID values for each subsystem to identify each subsystem and the subsystem's associated memory zones as defined by the subsystem memory range setting. The configuration storage also includes a processor control register to store the execution mode word. The execution mode word is asserted as an execution mode word signal identifying a currently active subsystem and indicating that the processor is configured in the isolated execution mode. The isolated memory area is only accessible to the processor when it is configured in the isolated execution mode.

In one embodiment, the multi-memory zone access checking circuit includes a subsystem address detector. The subsystem address detector detects if the physical address is within a currently active subsystem's associated memory zone as defined by the subsystem memory range setting for the subsystem. If the physical address is within the subsystem's associated memory zone, the subsystem address detector generates a subsystem address matching signal. An access grant generator is coupled to the subsystem address detector and the processor control register. The access grant generator generates an access grant signal if both the subsystem address matching signal and the execution mode word signal, identifying the currently active subsystem operating in the isolated execution mode, are asserted. Thus, only if the physical address requested by a processor, operating in an isolated execution mode, is within the correct memory zone for the currently initialized subsystem will the access transaction be granted.

In the following description, for purposes of explanation, numerous details are set forth in order to provide a thorough understanding of the present invention. However, it will be appreciated to one skilled in the art that these specific details are not required in order to practice the present invention. In other instances, well-known electrical structures and circuits are shown in block diagram form in order not to obscure the present invention.

ARCHITECTURE OVERVIEW

One principle for providing security in a computer system or platform is the concept of an isolated execution architecture. The isolated execution architecture includes logical and physical definitions of hardware and software components that interact directly or indirectly with an operating system of the computer system or platform. An operating system and the processor may have several levels of hierarchy, referred to as rings, corresponding to various operational modes. A ring is a logical division of hardware and software components that are designed to perform dedicated tasks within the operating system. The division is typically based on the degree or level of privilege, namely, the ability to make changes to the platform. For example, a ring-0 is the innermost ring, being at the highest level of the hierarchy. Ring-0 encompasses the most critical, privileged components. In addition, modules in Ring-0 can also access to lesser privileged data, but not vice versa. Ring-3 is the outermost ring, being at the lowest level of the hierarchy. Ring-3 typically encompasses users or applications level and has the least privilege protection. Ring-1 and ring-2 represent the intermediate rings with decreasing levels of privilege.

FIG. 1A is a diagram illustrating a logical operating architecture 50 according to one embodiment of the invention. The logical operating architecture 50 is an abstraction of the components of an operating system and the processor. The logical operating architecture 50 includes ring-0 10, ring-1 20, ring-2 30, ring-3 40, and a processor nub loader 52. The processor nub loader 52 is an instance of an processor executive (PE) handler. The PE handler is used to handle and/or manage a processor executive (PE) as will be discussed later. The logical operating architecture 50 has two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system, usually referred to as kernel. These software modules include primary operating system (e.g., kernel) 12, software drivers 13, and hardware drivers 14. The isolated execution Ring-0 15 includes an operating system (OS) nub 16 and a processor nub 18. The OS nub 16 and the processor nub 18 are instances of an OS executive (OSE) and processor executive (PE), respectively.

The OSE and the PE are part of executive entities that operate in a protected environment associated with the isolated area 70 and the isolated execution mode. The processor nub loader 52 is a protected bootstrap loader code held within a chipset in the system and is responsible for loading the processor nub 18 from the processor or chipset into an isolated area as will be explained later.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$ to $42_N$ and isolated execution ring-3 includes K applets $46_1$ to $46_K$.

One concept of the isolated execution architecture is the creation of an isolated region in the system memory, referred to as an isolated area, which is protected by both the processor and chipset in the computer system. The isolated region may also be in cache memory, protected by a translation look aside (TLB) access check. Access to this isolated region is permitted only from a front side bus (FSB) of the processor, using special bus (e.g., memory read and write) cycles, referred to as isolated read and write cycles. The special bus cycles are also used for snooping. The isolated read and write cycles are issued by the processor executing in an isolated execution mode. The isolated execution mode is initialized using a privileged instruction in the processor, combined with the processor nub loader 52. The processor nub loader 52 verifies and loads a ring-0 nub software module (e.g., processor nub 18) into the isolated area. The processor nub 18 provides hardware-related services for the isolated execution.

One task of the processor nub 18 is to verify and load the ring-0 OS nub 16 into the isolated area, and to generate the root of a key hierarchy unique to a combination of the platform, the processor nub 18, and the operating system nub 16. The processor nub 18 provides the initial set-up and low-level management of the isolated area including verification, loading, and logging of the operating system nub 16, and the management of a symmetric key used to protect the operating system nub's secrets. The processor nub 18 may also provide application programming interface (API) abstractions to low-level security services provided by other hardware.

The operating system nub 16 provides links to services in the primary OS 12 (e.g., the unprotected segments of the operating system), provides page management within the isolated area, and has the responsibility for loading ring-3 application modules 45, including applets $46_1$ to $46_K$, into protected pages allocated in the isolated area. The operating system nub 16 may also load ring-0 supporting modules.

The operating system nub 16 may choose to support paging of data between the isolated area and ordinary (e.g., non-isolated) memory. If so, then the operating system nub 16 is also responsible for encrypting and hashing the isolated area pages before evicting the page to the ordinary memory, and for checking the page contents upon restoration of the page. The isolated mode applets $46_1$ to $46_K$ and their data are tamper-resistant and monitor-resistant from all software attacks from other applets, as well as from non-isolated-space applications (e.g., $42_1$ to $42_N$), dynamic link libraries (DLLs), drivers and even the primary operating system 12. Only the processor nub 18 or the operating system nub 16 can interfere with or monitor the applet's execution.

Figure 1B:
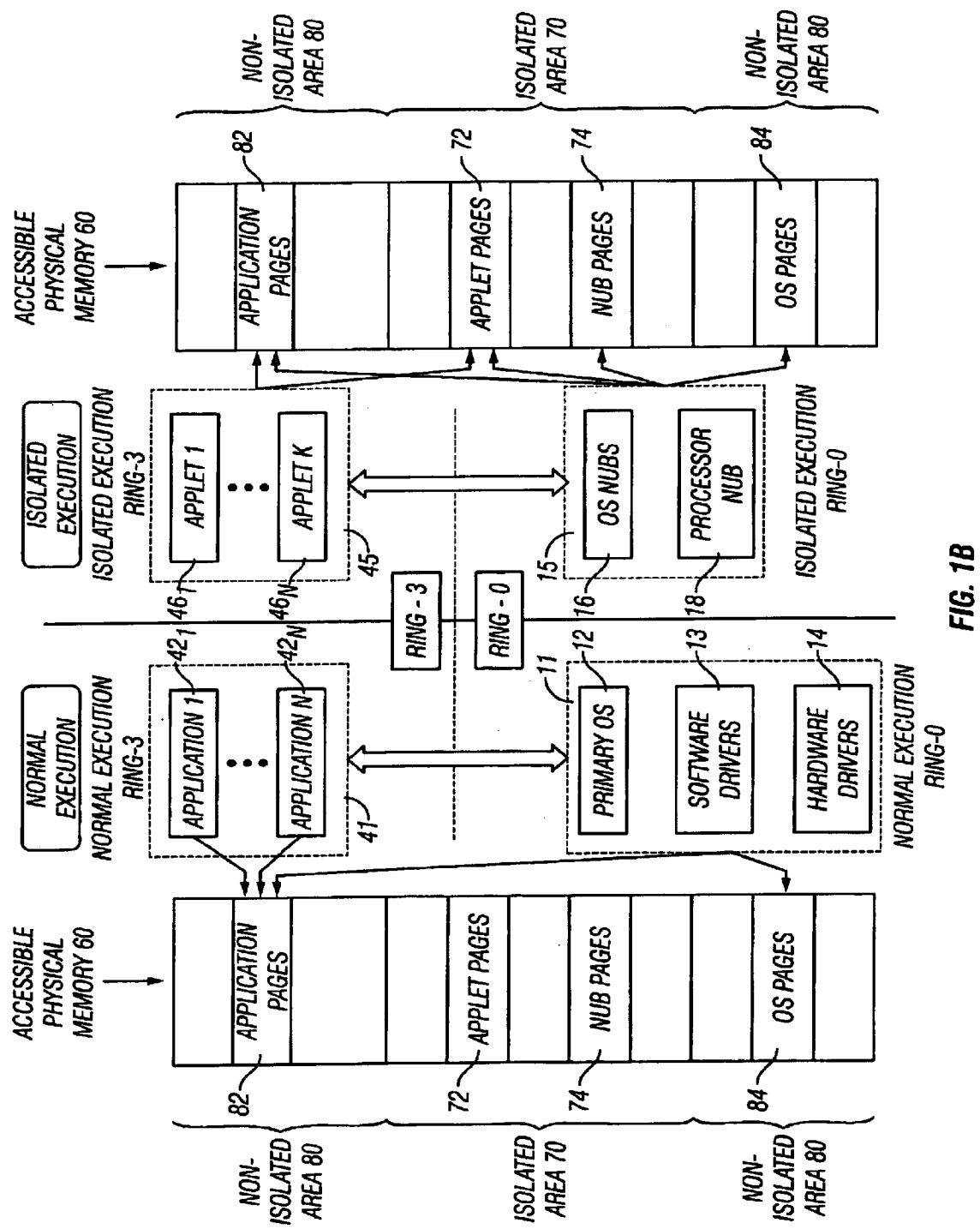
FIG. 1B is a diagram illustrating the accessibility of various elements in the operating system and the processor according to one embodiment of the invention.

FIG. 1B is a diagram illustrating accessibility of various elements in the operating system 10 and the processor according to one embodiment of the invention. For illustration purposes, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system pages 84. The isolated area 70 is accessible only to elements of the operating system and processor operating in isolated execution mode. The non-isolated area 80 is accessible to all elements of the ring-0 operating system and processor.

The normal execution ring-0 11 including the primary OS 12, the software drivers 13, and the hardware drivers 14, can access both the OS pages 84 and the application pages 82. The normal execution ring-3, including applications 42, to $42_N$, can access only to the application pages 82. Both the normal execution ring-0 11 and ring-3 41, however, cannot access the isolated area 70.

The isolated execution ring-0 15, including the OS nub 16 and the processor nub 18, can access both the isolated area 70, including the applet pages 72 and the nub pages 74, and the non-isolated area 80, including the application pages 82 and the OS pages 84. The isolated execution ring-3 45, including applets $46_1$ to $46_K$, can access only to the application pages 82 and the applet pages 72. The applets $46_1$ to $46_K$ reside in the isolated area 70.

Figure 1C:
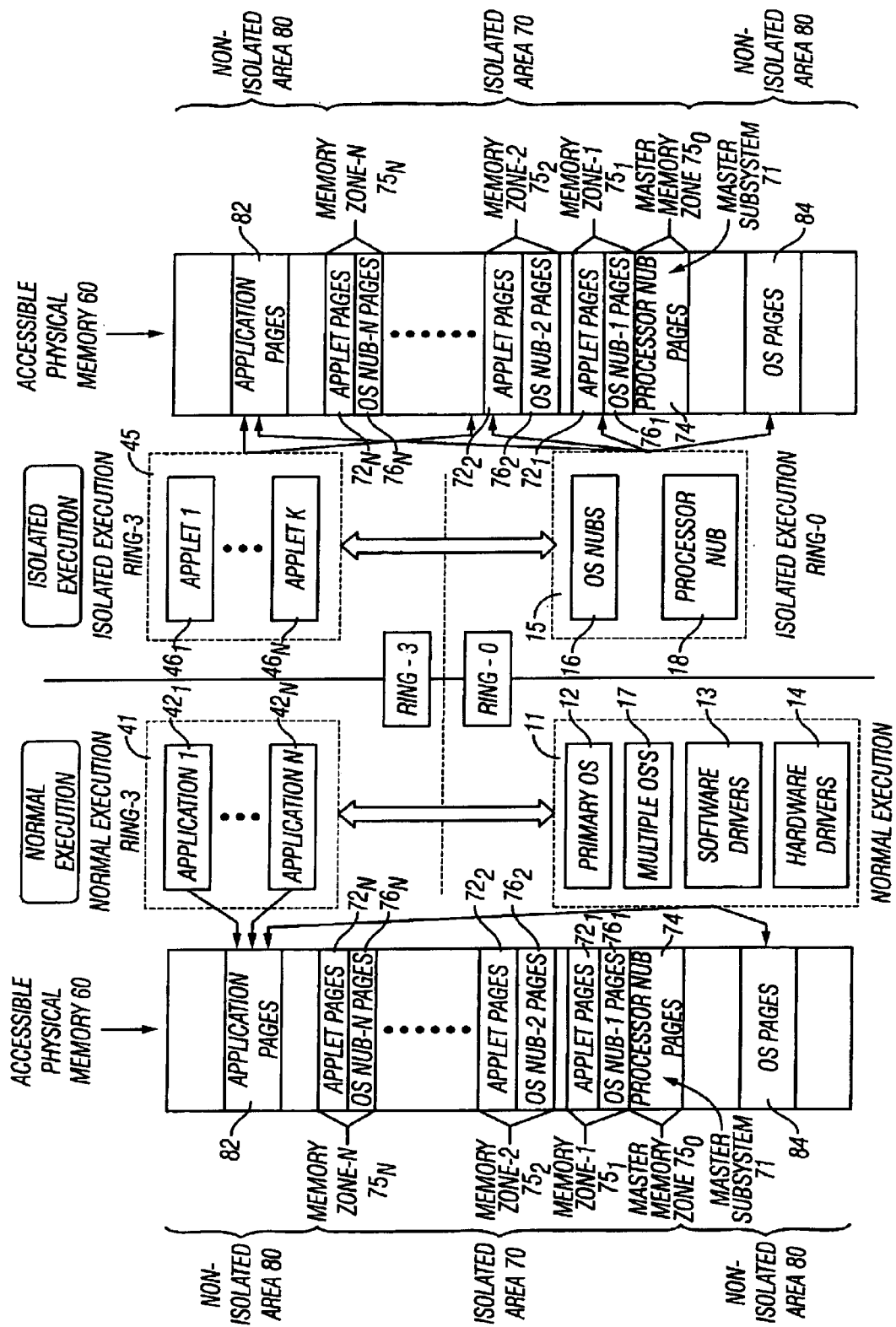
FIG. 1C is a diagram, similar to FIG. 1B, illustrating the accessibility of various elements in the operating system and the processor, in which an isolated memory area includes a plurality of memory zones each of which is associated with a subsystem, respectively, according to one embodiment of the invention.

FIG. 1C is a diagram, similar to FIG. 1B, illustrating the accessibility of various elements in the operating system and the processor, in which, an isolated memory area 70 includes a plurality of memory zones ($75_0$–$75_N$) each of which is associated with a subsystem, respectively, according to one embodiment of the invention. For illustration purposes, only elements of ring-0 10 and ring-3 40 are shown. The various elements in the logical operating architecture 50 access an accessible physical memory 60 according to their ring hierarchy and the execution mode. The accessible physical memory 60 includes an isolated area 70 and a non-isolated area 80. In this embodiment shown in FIG. 1C, the isolated memory area 70 is divided up into a plurality of memory zones ($75_0$–$75_N$) each of which is associated with a subsystem. Particularly, there is a master memory zone $75_0$ associated with a master subsystem 71 and a plurality of other memory zones ($75_1$–$75_n$) each of which is associated with an operating system to define a subsystem. This allows the present invention the ability to support concurrent multiple subsystems allowing for increased platform functionality.

To support the multiple subsystems, one of the subsystems is defined as the master subsystem 71. As illustrated in FIG. 1C, for exemplary purposes, the master subsystem 71 resides in master memory zone-0 $75_0$ and includes the processor nub 18 (processor executive (PE)) as processor nub pages 74. The processor nub 18 is loaded into one portion of the master memory zone-0 $75_0$. The master subsystem 71 is configured to include the entire isolated memory area 70 allowing it to control the memory used by the other zones. All other subsystems are configured as subsets of the master subsystem 70 and exclude the memory used by the processor nub 18. The master subsystem 71 is delegated with managing and creating the other subsystems and the other multiple memory zones ($75_1$–$75_N$). Particularly, the processor nub code executing in the master subsystem 71 provides the management and maintenance functions for the other subsystems such as allocating, configuring, initializing, and cleaning up the other memory zones. The master subsystem 71 is the only subsystem that can create additional subsystems by defining memory zones (e.g. $75_1$–$75_N$) in the isolated memory area 70. Also, only code executing from the master subsystem may change the configuration of the other subsystems. Further, no subsystem can examine or modify the contents of the master subsystem 71 or any other subsystem.

As shown in FIG. 1C, the present invention can have N number of memory zones to support N number of subsystems operating with N number of operating systems (OS's) and their corresponding OS nubs 16. Accordingly, the isolated memory area 70 can include multiple memory zones ($75_1$–$75_N$) each of which is associated with an operating system to define a subsystem. Only one memory zone and operating system is active at a time. Each OS nub corresponds to either the primary OS 12 or one of the multiple OS's 17, respectively. For example, a first subsystem could reside in memory zone-1 $75_1$ and includes the OS nub-1 pages $76_1$ and applet pages $72_1$. As an example, the OS nub-1 pages $76_1$ could correspond to the OS nub for the primary OS 12 which could be, for example, a Windows™ operating system. Further, a second subsystem may reside in memory zone-2 $75_2$ and includes one of the multiple OS nubs 16 as OS nub-2 pages $76_2$ and applet pages $72_2$. As an example, a Linux™ operating system could be a second subsystem residing in memory zone-2 $75_2$. Furthermore, other operating systems can be located in the other remaining memory zones $75_3$–$75_N$.

The non-isolated area 80 includes application pages 82 and operating system pages 84. The isolated area 70 is accessible only to elements of the operating system that is currently associated with the initialized subsystem and when the processor is operating in the isolated execution mode. The non-isolated area 80 is accessible to all elements of the ring-0 operating system and processor.

The normal execution ring-0 11 includes the primary OS 12, other multiple OS's 17, the software drivers 13, and the hardware drivers 14, all of which can access both the OS pages 84 and the application pages 82. The normal execution ring-3, including applications 421 to 42N, can access only the application pages 82. Both the normal execution ring-0 11 and ring-3 41, however, cannot access the isolated area 70.

The isolated execution ring-0 15 includes the OS nubs 16 and the processor nub 18. Only the currently active subsystem associated with a particular memory zone ($75_1$–$75_N$) in the isolated memory area 70, as previously discussed, can access that memory zone and its associated OS Nub pages ($76_1$–$76_N$) and applet pages ($72_1$–$72_N$). Further, no subsystem can examine or modify the contents of the master subsystem 71 or any other subsystem. However, the isolated execution ring-0 15, including the OS nubs 16 and the processor nub 18, can access the non-isolated area 80, including the application pages 82 and the OS pages 84. Also, the isolated execution ring-3 45, including applets $46_1$ to $46_K$, can access the application pages 82.

Figure 1D:
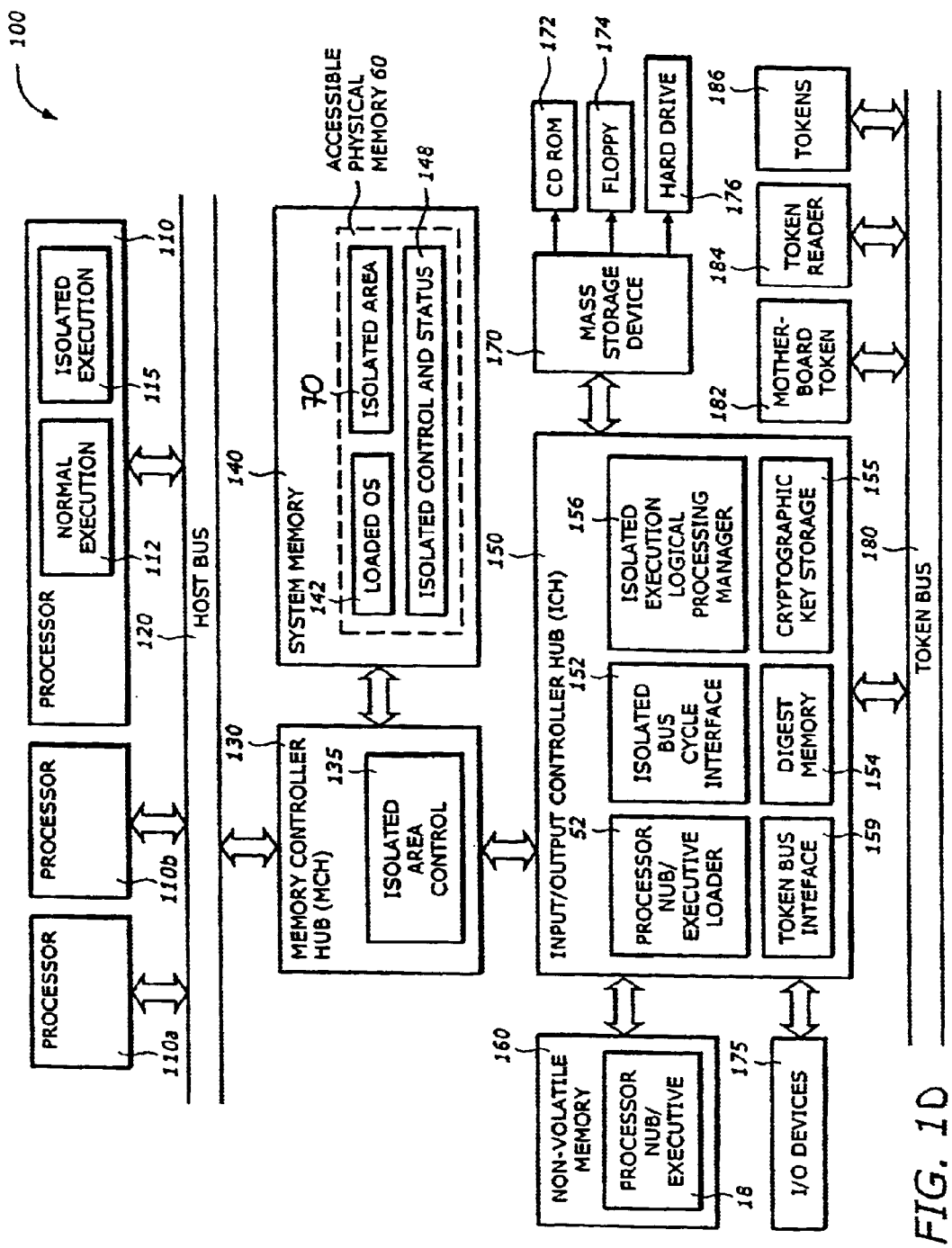
FIG. 1D is a diagram illustrating a computer system in which one embodiment of the invention can be practiced.

FIG. 1D is a diagram illustrating a computer system 100 in which one embodiment of the invention can be practiced. The computer system 100 includes a processor 110, a host bus 120, a memory controller hub (MCH) 130, a system memory 140, an input/output controller hub (ICH) 150, a non-volatile memory, or system flash, 160, a mass storage device 170, input/output devices 175, a token bus 180, a motherboard (MB) token 182, a reader 184, and a token 186. The MCH 130 may be integrated into a chipset that integrates multiple functionalities such as the isolated execution mode, host-to-peripheral bus interface, memory control. Similarly, the ICH 150 may also be integrated into a chipset together or separate from the MCH 130 to perform I/O functions. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with an Intel Architecture (IA) processor, such as the Pentium® processor series, the IA-32™ and the IA-64™. The processor 110 includes a normal execution mode 112 and an isolated execution circuit 115. The normal execution mode 112 is the mode in which the processor 110 operates in a non-protected environment, or a normal environment without the security features provided by the isolated execution mode. The isolated execution circuit 115 provides a mechanism to allow the processor 110 to operate in an isolated execution mode. The isolated execution circuit 115 provides hardware and software support for the isolated execution mode. This support includes configuration for isolated execution, definition of an isolated area, definition (e.g., decoding and execution) of isolated instructions, generation of isolated access bus cycles, and generation of isolated mode interrupts.

In one embodiment, the computer system 100 can be a single processor system, such as a desktop computer, which has only one main central processing unit, e.g. processor 110. In other embodiments, the computer system 100 can include multiple processors, e.g. processors 110, 110a, 110b, etc., as shown in FIG. 1D. Thus, the computer system 100 can be a multi-processor computer system having any number of processors. For example, the multi-processor computer system 100 can operate as part of a server or workstation environment. The basic description and operation of processor 110 will be discussed in detail below. It will be appreciated by those skilled in the art that the basic description and operation of processor 110 applies to the other processors 110a and 110b, shown in FIG. 1D, as well as any number of other processors that may be utilized in the multi-processor computer system 100 according to one embodiment of the present invention.

The processor 110 may also have multiple logical processors. A logical processor, sometimes referred to as a thread, is a functional unit within a physical processor having an architectural state and physical resources allocated according to some partitioning policy. Within the context of the present invention, the terms "thread" and "logical processor" are used to mean the same thing. A multi-threaded processor is a processor having multiple threads or multiple logical processors. A multi-processor system (e.g., the system comprising the processors 110, 110a, and 110b) may have multiple multi-threaded processors.

The host bus 120 provides interface signals to allow the processor 110 or processors 110, 110a, and 110b to communicate with other processors or devices, e.g., the MCH 130. In addition to normal mode, the host bus 120 provides an isolated access bus mode with corresponding interface signals for memory read and write cycles when the processor 110 is configured in the isolated execution mode. The isolated access bus mode is asserted on memory accesses initiated while the processor 110 is in the isolated execution mode. The isolated access bus mode is also asserted on instruction pre-fetch and cache write-back cycles if the address is within the isolated area address range and the processor 110 is initialized in the isolated execution mode. The processor 110 responds to snoop cycles to a cached address within the isolated area address range if the isolated access bus cycle is asserted and the processor 110 is initialized into the isolated execution mode.

The MCH 130 provides control and configuration of memory and input/output devices such as the system memory 140 and the ICH 150. The MCH 130 provides interface circuits to recognize and service isolated access assertions on memory reference bus cycles, including isolated memory read and write cycles. In addition, the MCH 130 has memory range registers (e.g., base and length registers) to represent the isolated area in the system memory 140. Once configured, the MCH 130 aborts any access to the isolated area that does not have the isolated access bus mode asserted.

The system memory 140 stores system code and data. The system memory 140 is typically implemented with dynamic random access memory (DRAM) or static random access memory (SRAM). The system memory 140 includes the accessible physical memory 60 (shown in FIG. 1B). The accessible physical memory includes a loaded operating system 142, the isolated area 70 (shown in FIG. 1B), and an isolated control and status space 148. The loaded operating system 142 is the portion of the operating system that is loaded into the system memory 140. The loaded OS 142 is typically loaded from a mass storage device via some boot code in a boot storage such as a boot read only memory (ROM). The isolated area 70, as shown in FIG. 1B, is the memory area that is defined by the processor 110 when operating in the isolated execution mode. Access to the isolated area 70 is restricted and is enforced by the processor 110 and/or the MCH 130 or other chipset that integrates the isolated area functionalities. The isolated control and status space 148 is an input/output (I/O)-like, independent address space defined by the processor 110 and/or the MCH 130. The isolated control and status space 148 contains mainly the isolated execution control and status registers. The isolated control and status space 148 does not overlap any existing address space and is accessed using the isolated bus cycles. The system memory 140 may also include other programs or data which are not shown.

The ICH 150 represents a known single point in the system having the isolated execution functionality. For clarity, only one ICH 150 is shown. The system 100 may have many ICH's similar to the ICH 150. When there are multiple ICH's, a designated ICH is selected to control the isolated area configuration and status. In one embodiment, this selection is performed by an external strapping pin. As is known by one skilled in the art, other methods of selecting can be used, including using programmable configuring registers. The ICH 150 has a number of functionalities that are designed to support the isolated execution mode in addition to the traditional I/O functions. In particular, the ICH 150 includes an isolated bus cycle interface 152, the processor nub loader 52 (shown in FIG. 1A), a digest memory 154, a cryptographic key storage 155, an isolated execution logical processing manager 156, and a token bus interface 159.

The isolated bus cycle interface 152 includes circuitry to interface to the isolated bus cycle signals to recognize and service isolated bus cycles, such as the isolated read and write bus cycles. The processor nub loader 52, as shown in FIG. 1A, includes a processor nub loader code and its digest (e.g., hash) value. The processor nub loader 52 is invoked by execution of an appropriate isolated instruction (e.g., Iso-Init) and is transferred to the isolated area 70. From the isolated area 80, the processor nub loader 52 copies the processor nub 18 from the system flash (e.g., the processor nub code 18 in non-volatile memory 160) into the isolated area 70, verifies and logs its integrity, and manages a symmetric key used to protect the processor nub's secrets. In one embodiment, the processor nub loader 52 is implemented in read only memory (ROM). For security purposes, the processor nub loader 52 is unchanging, tamper-resistant and non-substitutable. The digest memory 154, typically implemented in RAM, stores the digest (e.g., hash) values of the loaded processor nub 18, the operating system nub 16, and any other critical modules (e.g., ring-0 modules) loaded into the isolated execution space. The cryptographic key storage 155 holds a symmetric encryption/decryption key that is unique for the platform of the system 100. In one embodiment, the cryptographic key storage 155 includes internal fuses that are programmed at manufacturing. Alternatively, the cryptographic key storage 155 may also be created with a random number generator and a strap of a pin. The isolated execution logical processing manager 156 manages the operation of logical processors operating in isolated execution mode. In one embodiment, the isolated execution logical processing manager 156 includes a logical processor count register that tracks the number of logical processors participating in the isolated execution mode. The token bus interface 159 interfaces to the token bus 180. A combination of the processor nub loader digest, the processor nub digest, the operating system nub digest, and optionally additional digests, represents the overall isolated execution digest, referred to as an isolated digest. The isolated digest is a fingerprint identifying the ring-0 code controlling the isolated execution configuration and operation. The isolated digest is used to attest or prove the state of the current isolated execution.

The non-volatile memory 160 stores non-volatile information. Typically, the non-volatile memory 160 is implemented in flash memory. The non-volatile memory 160 includes the processor nub 18.

The processor nub 18 provides the initial set-up and low-level management of the isolated area 70 (in the system memory 140), including verification, loading, and logging of the operating system nub 16, and the management of the symmetric key used to protect the operating system nub's secrets. The processor nub 18 may also provide application programming interface (API) abstractions to low-level security services provided by other hardware. The processor nub 18 may also be distributed by the original equipment manufacturer (OEM) or operating system vendor (OSV) via a boot disk.

The mass storage device 170 stores archive information such as code (e.g., processor nub 18), programs, files, data, applications (e.g., applications $42_1$ to $42_N$), applets (e.g., applets $46_1$ to $46_K$) and operating systems. The mass storage device 170 may include compact disk (CD) ROM 172, floppy diskettes 174, and hard disk 176, and any other magnetic or optic storage devices. The mass storage device 170 provides a mechanism to read machine-readable media.

I/O devices 175 may include any I/O devices to perform I/O functions. Examples of I/O devices 175 include controller for input devices (e.g., keyboard, mouse, trackball, pointing device), media card (e.g., audio, video, graphics), network card, and any other peripheral controllers.

The token bus 180 provides an interface between the ICH 150 and various tokens in the system. A token is a device that performs dedicated input/output functions with security functionalities. A token has characteristics similar to a smart card, including at least one reserved-purpose public/private key pair and the ability to sign data with the private key. Examples of tokens connected to the token bus 180 include a motherboard token 182, a token reader 184, and other portable tokens 186 (e.g., smart card). The token bus interface 159 in the ICH 150 connects through the token bus 180 to the ICH 150 and ensures that when commanded to prove the state of the isolated execution, the corresponding token (e.g., the motherboard token 182, the token 186) signs only valid isolated digest information. For purposes of security, the token should be connected to the digest memory.

When implemented in software, the elements of the present invention are the code segments to perform the necessary tasks. The program or code segments can be stored in a machine readable medium, such as a processor readable medium, or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 2A:
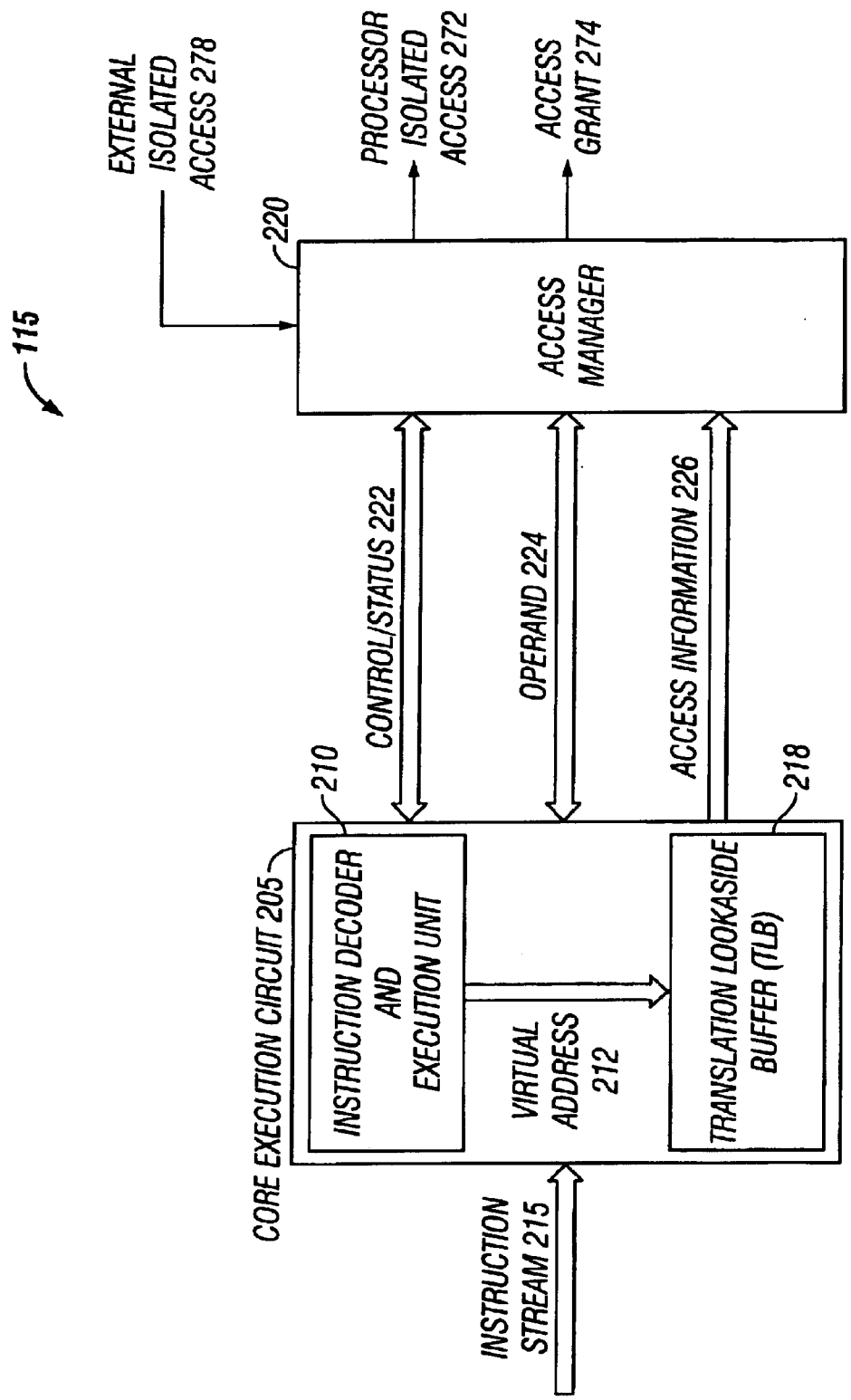
FIG. 2A is a diagram illustrating an embodiment of the isolated execution circuit shown in FIG. 1D according to one embodiment of the invention.

Controlling Access to Multiple Memory Zones in an Isolated Execution Environment FIG. 2A is a diagram illustrating an embodiment of the isolated execution circuit 115 shown in FIG. 1D according to one embodiment of the invention. The isolated execution circuit 115 includes a core execution circuit 205 and an access manager 220.

The core execution circuit 205 includes an instruction decoder and execution unit 210 and a translation lookaside buffer (TLB) 218. The instruction decoder and execution unit 210 receives an instruction stream 215 from an instruction fetch unit. The instruction stream 215 includes a number of instructions. The instruction decoder and execution unit 210 decodes the instructions and executes the decoded instructions. These instructions may be at the micro- or macro-level. The instruction decoder and execution unit 210 may be a physical circuit or an abstraction of a process of decoding and execution of instructions. In addition, the instructions may include isolated instructions and non-isolated instructions. The instruction decoder and execution unit 210 generates a virtual address 212 when there is an access transaction, caused by the execution of instructions. The TLB 218 translates the virtual address 212 into a physical address.

The core execution circuit 205 interfaces with the access manager 220 via control/status information 222, operand 224, and access information 226. The control/status information 222 includes control bits to manipulate various elements in the access manager 220 and status data from the access manager 220. The operand 224 includes data to be written to and read from the access manager 220. The access information 226 includes address (e.g., the physical address provided by the TLB 218), read/write, and access type information.

The access manager 220 receives and provides the control/status information 222 and the operand 224, and receives the access information 226 from the core execution circuit 205 as a result of instruction execution, and further receives an external isolated access signal 278 from another processor in the system. The external isolated access signal 278 is asserted when another processor in the system attempts to access the isolated memory area. The access manager 220 generates a processor isolated access signal 272 and an access grant signal 274. The processor isolated access signal 272 may be used to generate an isolated bus cycle sent to devices (e.g., chipsets) external to the processor 110 to indicate that the processor 110 is executing an isolated mode instruction. The processor isolated access signal 272 and the access grant signal 274 may also be used internally by the processor 110 to control and monitor other isolated or non-isolated activities.

Figure 2B:
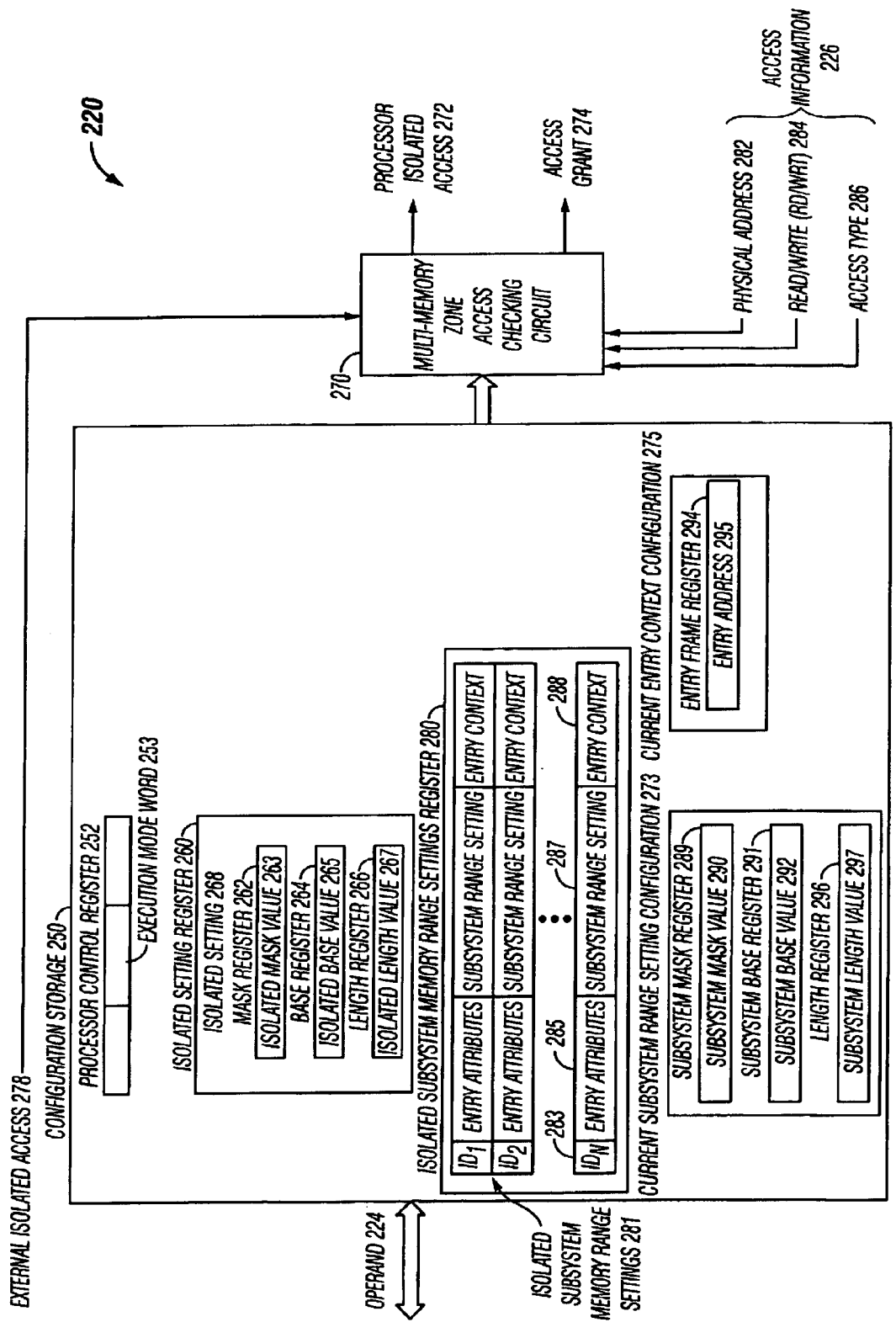
FIG. 2B is a diagram illustrating an access manager shown in FIG. 2A according to one embodiment of the invention.

FIG. 2B is a diagram illustrating the access manager 220 shown in FIG. 2A according to one embodiment of the invention. The access manager 220 includes a configuration storage 250 and a multi-memory zone access checking circuit 270. The access manager 220 exchanges the operand 224 with and receives the access information 226 from the core execution circuit 205 shown in FIG. 2A. The access manager 220 also receives the external isolated access signal 278 from another processor as previously shown in FIG. 2A. The access information 226 includes a physical address 282, a read/write (RD/WR#) signal 284 and an access type 286. The access information 226 is generated during an access transaction by the processor 110. The access type 286 indicates a type of access, including a memory reference, an input/output (I/O) reference, and a logical processor access. The logical processor access includes a logical processor entry to an isolated enabled state, and a logical processor withdrawal from an isolated enabled state.

The configuration storage 250 stores configuration parameters to configure an access transaction generated by the processor 110. The processor 110 has a normal execution mode and an isolated execution mode. The access transaction includes access information 226 as discussed above. The configuration storage 250 receives the operand 224 from the instruction decoder and execution unit 210 (FIG. 2A) and includes a processor control register 252, an isolated setting register 260, and an isolated subsystem memory range setting register 280. The processor control register 252 contains an execution mode word 253. The execution mode word 253 is asserted as an execution mode word signal when the processor 110 is configured in the isolated execution mode. In one embodiment, the execution mode word 253 stores the ID of the currently active subsystem operating in the isolated execution mode or an indicator that the processor is not currently in isolated execution mode.

The isolated setting register 260 contains an isolated setting 268. The isolated setting 268 defines the isolated memory area (e.g. the isolated area 70 in the accessible physical memory 60 shown in FIGS. 1B and 1C). The isolated setting register 260 includes a mask register 262, a base register 264, and a length register 266. The mask register 262 stores an isolated mask value 263. The base register 264 stores an isolated base value 265. The length register 266 stores an isolated length value 267. The isolated mask, base, and length values 263, 265, and 267 form the isolated setting 268 and are used to define the isolated memory area. The isolated memory area may be defined by using any combination of the mask, base, and length values 263, 265 and 267. For example, the base value 265 corresponds to the starting address of the isolated memory area, while the sum of the base value 265 and the length value 267 corresponds to the ending address of the isolated memory area.

The isolated subsystem memory range setting register 280 stores the isolated subsystem memory range settings 281. The isolated subsystem memory range settings 281 can be represented as a table having a plurality of rows and columns that store the settings for the subsystems within the isolated area. This table may represent the settings for all the possible subsystems in the isolated memory area, or it may represent a cache of settings for selected subsystems. Each row corresponds to a different subsystem and has a number of column entries that describe the subsystem and the subsystem's associated memory zone ($75_0$–$75_N$) in the isolated memory area 70 (FIG. 1C). Each row includes an ID value 283, an entry attribute 285, a subsystem range setting 287, and an entry context 288. The ID value is a unique identifier for each subsystem. The entry attribute 285 includes a plurality of values including page size (such as large or normal sized), read or write access, and a master subsystem flag.

Each subsystem identified by the isolated subsystem memory range settings 281 includes a subsystem range setting 287 having a subsystem mask value, a subsystem base value, and a subsystem length value, as will be discussed in more detail, that defines a memory zone ($75_0$–$75_N$) for a respective subsystem in the isolated memory area 70 (FIG. 1C). Each subsystem identified by the isolated subsystem memory range settings 281 also includes an entry context 288. The entry context 288 is used for entry by a subsystem into its associated memory zone for isolated execution.

One subsystem is defined as the master subsystem, and given a pre-defined fixed ID 283. This master subsystem is configured to include the entire isolated memory area. The processor nub is loaded into one portion of the master subsystem memory. All other subsystems are configured as subsets of the master subsystem, and exclude the memory used by the processor nub. The code executing in the master subsystem provides the management and maintenance functions for the other subsystems. Only code executing from the master subsystem may change the content of the isolated subsystem memory range setting register 280, thereby changing the configuration of the other subsystems.

When a master subsystem is initialized it fills in a row of the isolated subsystem memory range setting register 280 for itself including: setting its predetermined ID value 283, setting the master subsystem flag as a fixed entry in the entry attributes 285 to identify itself as the master subsystem, defining its associated memory zone using the subsystem range setting 287, and setting its entry address in the entry context 288. The isolated subsystem memory range setting register 280 is controlled by the master subsystem executive which corresponds to the processor nub 18 (or processor executive (PE)) of the master subsystem 71 (FIG. 1C). As the master subsystem initializes new subsystems it creates new rows in the isolated subsystem memory range setting register 280 defining each new subsystem.

To pass control from a first subsystem to a second subsystem, a subsystem control change instruction is issued. The subsystem control change instruction uses the second subsystem ID which is called as a parameter. The processor checks the IDs 283 of the isolated subsystem memory range settings 281 for a match, and if a match is found, the processor extracts the subsystem range setting 287 (e.g. subsystem mask value, subsystem base value, and subsystem length value to define the memory zone of the second subsystem) and the entry context field 288 of the second subsystem and copies them into the current subsystem range setting configuration register 273 and the current entry context configuration register 275, respectively. These new configuration registers represent the configuration for the currently active subsystem, and are used to drive the multi-memory zone access checking circuit 270, as will be discussed.

The current subsystem range setting configuration register 273 includes a subsystem mask register 289, a subsystem base register 291, and a subsystem length register 296. The subsystem mask register 289 stores a subsystem mask value 290. The subsystem base register 291 stores a subsystem base value 292. The subsystem length register 296 stores a subsystem length value 297. The memory zone ($75_0$–$75_N$) of the isolated memory area 70 (FIG. 1C) for the currently active subsystem may be defined by any combination of the subsystem mask, base, and length values 290, 292, and 297. For example, the base value 292 corresponds to the starting address of the memory zone for the currently active subsystem, while the sum of the base value 292 and the length value 297 corresponds to the ending address of the memory zone for the currently active subsystem. The current entry context configuration register 275 includes an entry frame register 294 to store an entry frame address 295 copied from the entry context field 288. The entry address 295 is the physical address of the entry frame.

The processor can then enter into an isolated execution mode (e.g. iso_enter) under the control of the second subsystem. To do this, the processor loads an entry frame into a frame register set. The entry frame is pointed to by the entry address 295 in the entry frame register 296. The processor is now configured in an isolated execution mode under the control of the second subsystem, which is now the currently active subsystem, the memory zone of which is identified by the values stored in the current subsystem range setting configuration register 273, as previously discussed.

However, if an ID match does not occur, and a corresponding row of the isolated subsystem memory range settings 281 does not exist for the second subsystem, the processor checks the isolated subsystem memory range settings 281 for the master subsystem, which is identified by the set master subsystem flag in the entry attributes 285. The processor loads the parameters of the corresponding row of the subsystem isolated subsystem memory range settings 281 for the master subsystem and passes control to the master subsystem. Upon entry of the master subsystem, the processor determines that the second subsystem parameter ID is not for the master subsystem, but a different subsystem. If the second subsystem exists, the master subsystem defines the second subsystem in the isolated subsystem memory range settings 281 by creating a new row for the second subsystem. If the memory range setting register 280 is a cache, with fewer entries than the possible subsystems, and there are no unused entries available, then the master subsystem may evict one of the existing entries to replace it with the new row for the second subsystem. Only the master subsystem entry cannot be replaced. Control is then passed from the master subsystem (i.e. the first subsystem) to the second subsystem as previously discussed. However, if the second subsystem does not exist, the processor generates a failure or fault condition.

The multi-memory zone access checking circuit 270 checks the access transaction using at least one of the configuration parameters (e.g. the execution mode word 253 and the current subsystem range setting configuration 273) and the access information 226. The multi-memory zone access checking circuit 270 generates the processor isolated access signal 272 and the access grant signal 274. The processor isolated access signal 272 is asserted when the processor 110 attempts a memory access to a physical address within the isolated memory area 70. The access grant signal 274 indicates whether a memory access request can be granted. The access grant signal 274 is asserted if the requested memory address is outside the isolated memory range, OR, the processor is currently executing in isolated mode AND the address is within the currently active isolated subsystem memory range.

Figure 3:
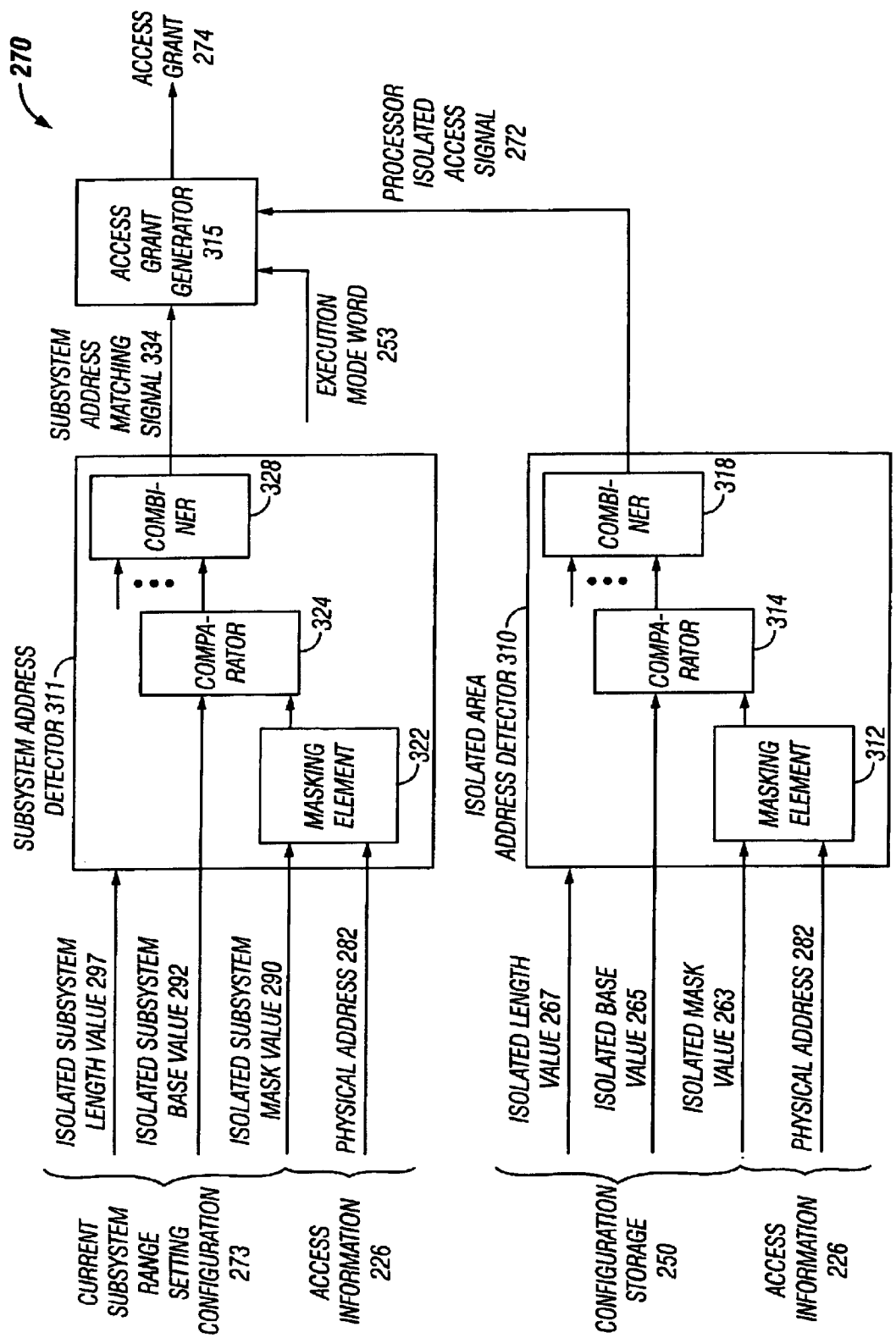
FIG. 3 is a diagram illustrating a multi-memory zone access checking circuit according to one embodiment of the invention.

FIG. 3 is a diagram illustrating the multi-memory zone access checking circuit 270 to manage accesses for isolated execution according to one embodiment of the invention. The multi-memory zone access checking circuit 270 includes an isolated area address detector 310, a subsystem address detector 311 and an access grant generator 315.

The isolated area address detector 310 receives the isolated setting 268 (e.g., the isolated mask value 263, the isolated base value 265, the isolated length value 267) from the configuration storage 250 in FIG. 2B. The isolated area address detector 310 detects if the physical address 282 is within the isolated memory area defined by the isolated setting 268. The isolated area address detector 310 includes a masking element 312, a comparator 314, and a combiner 318. The masking element 312 masks the physical address 282 with the isolated mask value 263. In one embodiment, the masking element 312 performs a logical AND operation. The comparator 314 compares the result of the masking operation done by the masking element 312 and the isolated base value 265, and generates a comparison result. In other embodiments, the comparator 314 can also use the isolated length value 267 in generating the comparison result. The combiner 318 combines the comparison result with other conditions to generate the processor isolated access signal 272. The processor isolated access signal 272 is asserted when the physical address 282 is within the isolated memory area as defined by the isolated mask and base values 263 and 265, and in some embodiments, the length value 267.

The subsystem address detector 311 receives the values of the current subsystem range setting configuration register 273 (e.g., the isolated subsystem mask value 290, the isolated subsystem base value 292, and the isolated subsystem length value 297) from the configuration storage 250 in FIG. 2B and receives access information 226 (e.g. a physical address 282). The subsystem address detector 311 detects if the physical address 282 is within a subsystem's associated memory zone as defined by the values of the current subsystem range setting configuration 273. The subsystem address detector 311 includes a masking element 322, a comparator 324, and a combiner 328. The masking element 322 masks the physical address 282 with the subsystem mask value 290. In one embodiment, the masking element 322 performs a logical AND operation. The comparator 324 compares the result of the masking operation done by the masking element 322 and the subsystem base value 292, and generates a comparison result. In other embodiments, the comparator 324 can also use the isolated length value 297 in generating the comparison result. The combiner 328 combines the comparison result with other conditions to generate a subsystem address matching signal 334. The subsystem address matching signal 334 is asserted when the physical address 282 is within a currently active subsystem's associated memory zone ($75_0$–$75_N$) as defined by the values of the current subsystem range setting configuration 273.

The access grant generator 315 combines the subsystem address matching signal 334, the execution mode word 253, and the processor isolated access signal 272 to generate the access grant signal 274. The access grant signal 274 indicates whether a memory access request can be granted. The access grant signal 274 is asserted and a memory access is granted, if the requested memory address is outside the isolated memory area 70, OR, the processor is currently executing in isolated mode AND the address is within the currently active isolated subsystem memory range. For example, when the processor isolated access signal 272 is not asserted, the requested physical address is outside the isolated memory range and the access grant signal 274 is asserted to grant a memory access to the non-isolated memory area. Alternatively, the access grant signal 274 is asserted when the processor isolated access signal 272 is asserted and both the subsystem address matching signal 334 and the execution mode word 253 for the currently active subsystem are asserted. This indicates that an isolated access to the memory zone in the isolated memory area for the currently active subsystem is valid or allowed as configured. In one embodiment, the access grant generator 315 performs a logical AND operation of these signals. Thus, only if the physical address requested by a processor, operating in an isolated execution mode, is within the correct memory zone for the currently active subsystem will the access transaction be granted.

Figure 4:
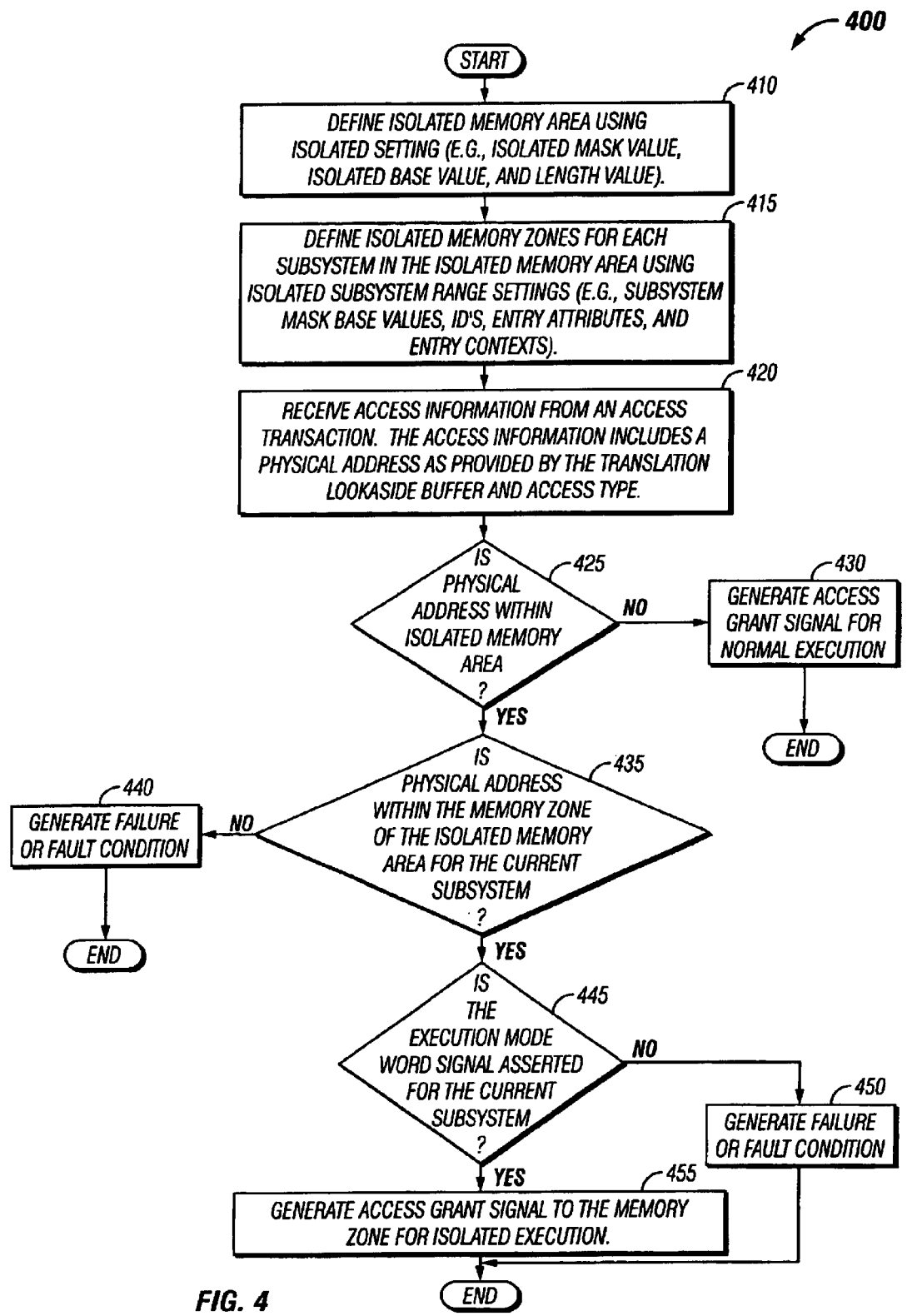
FIG. 4 is a flowchart illustrating a process to control access to multi-memory zones of the isolated memory area for isolated execution according to one embodiment of the invention.

FIG. 4 is a flowchart illustrating a process 400 to control access to multi-memory zones of the isolated memory area for isolated execution according to one embodiment of the invention.

Upon START, the process 400 defines as an isolated memory area using the isolated setting (e.g., isolated mask value, isolated base value, and length value) (block 410). Next, the process 400 defines isolated memory zones for each subsystem in the isolated memory area using isolated subsystem range settings (e.g., subsystem mask and base values, ID's, entry attributes, and entry contexts) (block 415). Then, the process 400 receives access information from an access transaction. The access information includes a physical address as provided by the Translation Lookaside Buffer and access type (block 420). The process 400 then determines if the physical address is within the isolated memory area (block 425). If not, then the process 400 generates an access grant signal for normal execution (block 430).

If the physical address does fall within the isolated area of memory, then the process 400 determines whether the physical address falls within the memory zone of the isolated memory area for the currently active subsystem (block 435). If not, the process 400 generates a failure or fault condition (block 440). However, if the physical address does fall within the memory zone for the currently active subsystem, then the process 400 determines if the execution mode word signal is asserted for the currently active subsystem (block 445). If not, the process 400 generates a failure or fault condition (block 450). Otherwise, the process generates an access grant signal to the memory zone for the currently active subsystem for isolated execution (block 455). The process 400 is then terminated. Thus, only if the physical address requested by a processor, operating in an isolated execution mode, is within the correct memory zone for the currently active subsystem will the access transaction be granted.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:

a configuration storage to store configuration settings to configure an access transaction generated by a processor having a first execution mode and a second execution mode, the configuration storage to store an execution mode identifier that is asserted as an execution mode signal to indicate the processor is operating in the first execution mode, the configuration settings including subsystem memory range settings, a memory base value, and a memory length value, a combination of at least the base and length values to define a protected memory area in a memory external to the processor that is accessible to the processor in the first execution mode, and the configuration settings to define an un-protected memory area that is accessible to the processor in the second execution mode, wherein the processor in the second execution mode cannot access the protected memory area, the access transaction including access information including a physical address;

a protected memory zone in the protected memory area defined by a subsystem memory range setting;

an un-protected memory zone in the un-protected memory area; and a memory zone access checking circuit coupled to the configuration storage to check the access transaction using at least one of the configuration settings and the access information to determine if the access transaction is valid and generating an access grant signal if the transaction is valid.

2. The apparatus of claim 1 wherein the protected memory zone in the protected memory area includes at least one protected memory page.

3. The apparatus of claim 2 wherein the at least one protected memory page includes an applet page.

4. The apparatus of claim 2 wherein the at least one protected memory page includes an OS nub page.

5. The apparatus of claim 2 wherein the at least one protected memory page includes a processor nub page.

6. The apparatus of claim 1 further comprising an identifier that identifies a currently active protected memory zone and that the processor is operating in the first execution mode.

7. The apparatus of claim 6 wherein determining if the access transaction is valid further comprises determining if the physical address is within the currently active protected memory zone and if the identifier is asserted.

8. The apparatus of claim 6 wherein the multi-memory zone access checking circuit comprises a memory zone detector to detect if the physical address is within the currently active protected memory zone such that the memory zone detector generates a memory zone matching signal.

9. The apparatus of claim 8 wherein the multi-memory zone access checking circuit further comprises an access grant generator coupled to the memory zone detector, the access grant generator generating an access grant signal if both the memory zone matching signal and identifier are asserted.

10. A method comprising:

configuring an access transaction generated by a processor having a first execution mode and a second execution mode;

generating configuration settings that are stored in a configuration storage including an execution mode identifier that is asserted as an execution mode signal to indicate the processor is operating in the first execution mode, the configuration settings further including subsystem memory range settings, a memory base value, and a memory length value, a combination of at least the base and length values to define a protected memory area in a memory external to the processor that is accessible to the processor in the first execution modes and the configuration settings to define an un-protected memory area that is accessible to the processor in the second execution mode, wherein the processor in the second execution mode cannot access the protected memory area, the access transaction including access information including a physical address;

defining a protected memory zone in the protected memory area defined by a subsystem memory range setting;

defining an un-protected memory zone in the un-protected memory area; and checking the access transaction using at least one of the configuration settings and the access information to determine if the access transaction is valid.

11. The method of claim 10 wherein the protected memory zone in the protected memory area includes at least one protected memory page.

12. The method of claim 11 wherein the at least one protected memory page includes an applet page.

13. The method of claim 11 wherein the at least one protected memory page includes an OS nub page.

14. The method of claim 11 wherein the at least one protected memory page includes a processor nub page.

15. The method of claim 10 wherein an identifier is used to identify a currently active protected memory zone and that the processor is operating in the first execution mode.

16. The method of claim 15 wherein determining if the access transaction is valid further comprises determining if the physical address is within the currently active protected memory zone and if the identifier is asserted.

17. The method of claim 15 further comprising detecting if the physical address is within the currently active protected memory zone such that a memory zone matching signal is generated.

18. The method of claim 17 further comprising generating an access grant signal if both the memory zone matching signal and identifier are asserted.

19. A machine-readable medium having stored thereon instructions, which when executed by a machine, cause the machine to perform the following operations comprising:

configuring an access transaction generated by a processor having a first execution mode and a second execution mode;

generating configuration settings that are stored in a configuration storage including an execution mode identifier that is asserted as an execution mode signal to indicate the processor is operating in the first execution mode, the configuration settings further including subsystem memory range settings, a memory base value, and a memory length value, a combination of at least the base and length values to define a protected memory area in a memory external to the processor that is accessible to the processor in the first execution mode, and the configuration settings to define an un-protected memory area that is accessible to the processor in the second execution mode, wherein the processor in the second execution mode cannot access the protected memory area, the access transaction including access information including a physical address;

defining a protected memory zone in the protected memory area defined by a subsystem memory range setting;

defining an un-protected memory zone in the un-protected memory area; and checking the access transaction using at least one of the configuration settings and the access information to determine if the access transaction is valid.

20. The machine-readable medium of claim 19 wherein the protected memory zone in the protected memory area includes at least one protected memory page.

21. The machine-readable medium of claim 20 wherein the at least one protected memory page includes an applet page.

22. The machine-readable medium of claim 20 wherein the at least one protected memory page includes an OS nub page.

23. The machine-readable medium of claim 20 wherein the at least one protected memory page includes a processor nub page.

24. The machine-readable medium of claim 19 wherein an identifier is used to identify a currently active protected memory zone and that the processor is operating in the first execution mode.

25. The machine-readable medium of claim 24 wherein determining if the access transaction is valid further comprises determining if the physical address is within the currently active protected memory zone and if the identifier is asserted.

26. The machine-readable medium of claim 24 further comprising detecting if the physical address is within the currently active protected memory zone such that a memory zone matching signal is generated.

27. The machine-readable medium of claim 26 further comprising generating an access grant signal if both the memory zone matching signal and identifier are asserted.

28. A system comprising:

a chipset;

a memory coupled to the chipset;

a processor coupled to the chipset and the memory having an access manager, the processor having a first execution mode and a second execution mode, the processor generating an access transaction having access information, the access manager comprising:

a configuration storage to store configuration settings to configure an access transaction generated by a processor having a first execution mode and a second execution mode, the configuration storage to store an execution mode identifier that is asserted as an execution mode signal to indicate the processor is operating in the first execution mode, the configuration settings including subsystem memory range settings, a memory base value, and a memory length value, a combination of at least the base and length values to define a protected memory area in a memory external to the processor that is accessible to the processor in the first execution model, and the configuration settings to define an un-protected memory area that is accessible to the processor in the second execution mode, wherein the processor in the second execution mode cannot access the protected memory area, the access transaction including access information including a physical address;

a protected memory zone in the protected memory area defined by a subsystem memory range setting;

an un-protected memory zone in the un-protected memory area; and a memory zone access checking circuit coupled to the configuration storage to check the access transaction using at least one of the configuration settings and the access information to determine if the access transaction is valid and generating an access grant signal if the transaction is valid.

29. The system of claim 28 wherein the protected memory zone in the protected memory area includes at least one protected memory page.

30. The system of claim 29 wherein the at least one protected memory page includes an applet page.

31. The system of claim 29 wherein the at least one protected memory page includes an OS nub page.

32. The system of claim 29 wherein the at least one protected memory page includes a processor nub page.

33. The system of claim 28 further comprising an identifier that identifies a currently active protected memory zone and that the processor is operating in the first execution mode.

34. The system of claim 33 wherein determining if the access transaction is valid further comprises determining if the physical address is within the currently active protected memory zone and if the identifier is asserted.

35. The system of claim 33 wherein the multi-memory zone access checking circuit comprises a memory zone detector to detect if the physical address is within the currently active protected memory zone such that the memory zone detector generates a memory zone matching signal.

36. The system of claim 35 wherein the multi-memory zone access checking circuit further comprises an access grant generator coupled to the memory zone detector, the access grant generator generating an access grant signal if both the memory zone matching signal and identifier are asserted.

* * * * *